W. G. LUMSDEN.
TOMATO CORING MACHINE.
APPLICATION FILED OCT. 3, 1908.
925,116.
Patented June 15, 1909.
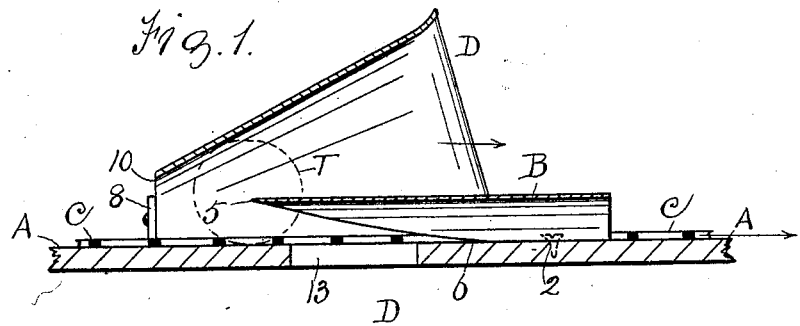
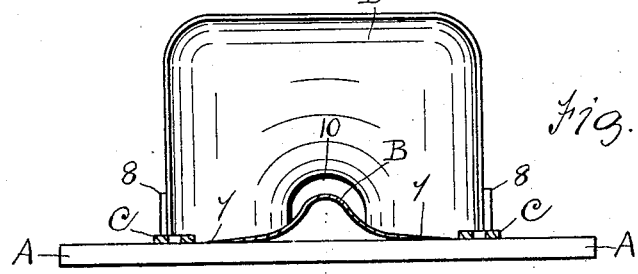
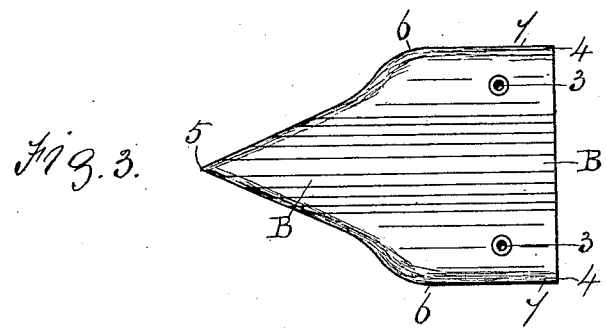
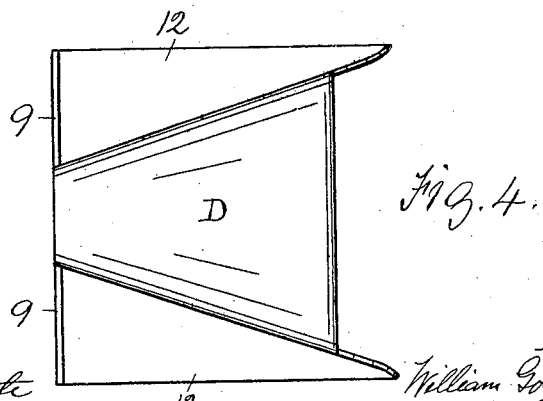
Witnesses.
Charles Gentle
Wm. Locher
Inventor.
William Godfrey Lumsden
By John K. Hendry
His Attorney.

UNITED STATES PATENT OFFICE.

WILLIAM GODFREY LUMSDEN, OF HAMILTON, ONTARIO, CANADA.

TOMATO-CORING MACHINE.

No. 925,116.

Specification of Letters Patent.

Patented June 15, 1909.

Application filed October 3, 1908. Serial No. 456,061.

*To all whom it may concern:*

Be it known that I, WILLIAM GODFREY LUMSDEN, a subject of the King of Great Britain, residing at Hamilton, in the county of Wentworth, in the Province of Ontario, Canada, have invented new and useful Improvements in Tomato-Coring Machines, of which the following is a specification.

My invention relates to improvements in tomato coring machines in which a stationary coring knife is secured on a suitable table, or frame, and a number of spaced tapered tomato carriers are secured to an endless belt adapted to travel on the table and toward the pointed end of the knife, and bring the core of the tomato in contact with the knife, and means to discharge the core.

The objects of my invention are, first, to provide a suitable pointed stationary knife secured on a table adapted to cut the core out of a tomato when the same is automatically brought to and over the knife, second, to provide means for confining the tomato and thereby exerting automatic side and top pressure thereon, while being cored, and third, to afford facilities for discharging the core. I attain these objects by the mechanism illustrated in the accompanying drawing, in which:—

Figure 1 is a sectional side elevation of the machine showing the ends of the endless belt and the table broken. Fig. 2 is an end elevation of the same as viewed from the right-hand end of the machine. Fig. 3 is a plan of the detached coring knife. Fig. 4 is a plan of the detached tomato carrier.

Similar letters refer to similar parts throughout the several views.

In the drawing A is a stationary table, or frame, B is the knife rigidly secured on the top of the table, or plane, by means of countersunk screws 2, through the holes 3 of the side flanges 4 of the knife. The body of the knife is of ogee section which extends above the table as shown in Fig. 2 of the drawing, and the forward and cutting end of the knife is pointed as at 5, in Figs. 1 and 3, of the drawing. The cutting edge of the knife extends from the point 5, to and along the gradual spreading sides as far as the beginning of the curves as indicated by 6, and from the parts 6 the cutting edges gradually rise from the table to said point. The side edges 7 of the flanges of the knife are also beveled to a feather edge, as shown in Fig. 2 of the drawing, to facilitate the passage of a tomato and thereby offer no obstruction to said passage.

C, is a belt, and travels on the table as indicated by the arrow in Fig. 1.
D, is one of a number of tomato carriers secured on the belt and spaced at certain distances apart and travels with the belt. The belt is provided with suitable lips 8, which are secured to the flanges 9 on the smaller and rear end of the carrier.

The front end of the carrier has a wide open bell, or funnel shaped mouth, the sides together with the top recede, or gradually taper, toward the rear end thereof, which terminates with a much smaller opening 10, as shown in Fig. 2 of the drawing. The flanges 12 of the carrier rest on the table A, and the carrier proper comprises tapering sides and top tapering toward the rear, with the bottom open to the table.

In Fig. 1 of the drawing the carrier is shown traveling over the stationary knife, and about three fourths way on its passage over and beyond the knife and in the same direction of the belt as indicated by the arrow.

The operation of the machine is as follows: While the belt is traveling on the table a tomato is placed in the funnel or wide mouth of the carrier, or placed immediately in front of the carrier, and the carrier then carries the tomato over the knife, and while the knife is operating the tapered top and sides of the carrier guide and hold the tomato while being operated upon. At this time the flesh of the tomato is carried forward by the carrier and allowed to drop into a prepared place. The core of the tomato drops through a suitable opening 13, in the table.

T is the broken outline of a tomato on the table and in the carrier, which is adapted to bring the tomato to the knife, and said knife cuts and severs the centrally located core, or hard part, of the tomato, from the flesh thereof, together with a portion of the lower skin thereof.

The advantages of the shape of the knife are; first, the forward pointed end of the knife enters the tomato thereby breaking the skin thereof, and the widening part of the knife severs the core together with a portion of the skin from the tomato, thereby exposing the flesh thereof; second, on account of the knife gradually extending or widening side wise from the point thereof, and gradually tapering, or sloping, at the same time to the surface of the table, and in feather edge form to and on the table, said knife is adapted to sever only the objectionable parts of the tomato, that is, the core and the under skin thereof, thereby offering little or no material obstruction to the forward movement of the tomato, while the same is being carried forward on the stationary table. The tapered sides and top of the carrier press the top and sides of the tomato on the surface of the table and into contact with the knife, thereby preventing the tomato from scattering into portions. The tapered carrier suits various sizes of tomatoes. The tomato is placed stem, or core side, on the table, and the knife being of an inverted V section, the flesh on the front and rear sides of the core of the tomato next to the table and in horizontal line therewith, and with the knife, is severed together with the core from the tomato, the severance being in the shape of the inverted V shape of the knife.

What I claim as my invention and desire to secure by Letters Patent, is:

1. In a machine to core and partially skin a tomato, a stationary table having an opening, a knife of ogee section having beveled side flanges beveled to and secured to the table in proximity to said opening therein, and having an elongated cutting point above the table with gradually spreading and curved cutting sides gradually sloping from said point to said flanges and forming the same, a belt adapted to travel on the table and on both sides of the knife, a funnel shaped carrier having tapered closed sides and top attached to said belt and adapted to carry and guide a tomato on and over said knife and to prevent said tomato from spreading and disintegration when being cored by the knife.

2. In a tomato coring machine, a table having an opening, a knife of ogee section and pointed extending above the table and the cutting edge gradually widening out in curved form from said point and gradually extending in a downward direction to the top of the table, thereby forming side flanges flush with said top and secured thereto, a tapered guide for forwarding and pressing a tomato on and over said knife, to core and partially skin the tomato.

WILLIAM GODFREY LUMSDEN.

Witnesses:
JOHN H. HANDY,
JAS. M. SHEPARD.